March 10, 1931. V. M. DIRKES 1,795,297
LUBRICATION SYSTEM FOR SHOP MACHINERY
Filed May 9, 1927
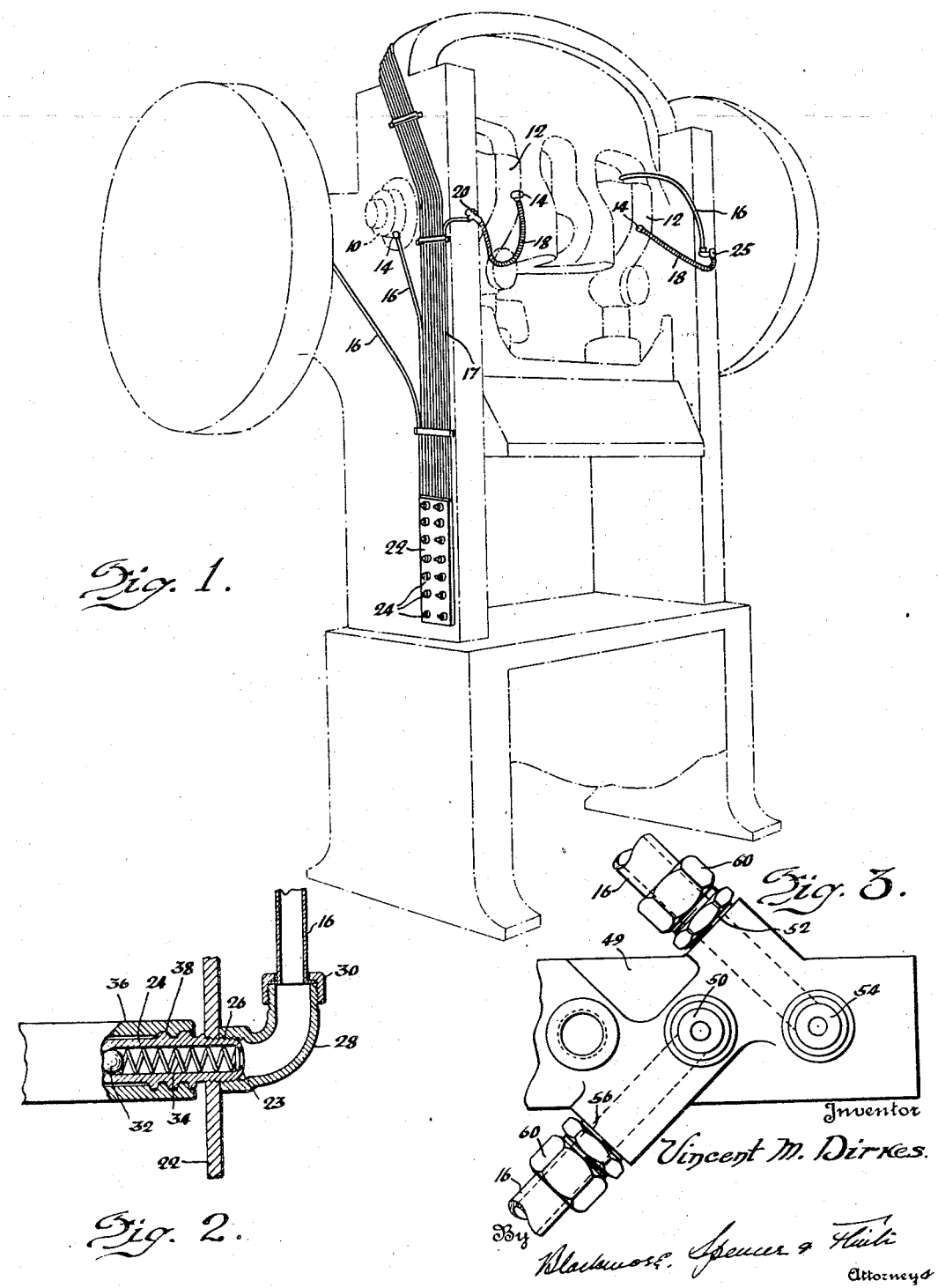

Patented Mar. 10, 1931

1,795,297

UNITED STATES PATENT OFFICE

VINCENT M. DIRKES, OF DETROIT, MICHIGAN, ASSIGNOR TO GENERAL MOTORS CORPORATION, OF DETROIT, MICHIGAN, A CORPORATION OF DELAWARE

LUBRICATION SYSTEM FOR SHOP MACHINERY

Application filed May 9, 1927. Serial No. 190,017.

This invention relates to a high pressure lubricating system for machinery.

I have illustrated my invention as applied to stationary machines, as most advantageous results have been obtained by the installation of my system on stationary machinery, but I wish it to be clearly understood that my invention is capable of being used, with equally favorable results, on non-stationary machinery, such as automobiles and traction engines, or in fact on any machinery having a plurality of bearings.

In arriving at my solution of the lubrication problem, I conducted considerable research work and kept very accurate comparative data on the results obtained by the use of my device with press and wood-working machinery and the results obtained by the ordinary method of lubricating machinery. In order to insure adequate lubrication of stationary machinery in the past, it has been necessary to stop each machine for oiling. This required from five to thirty minutes, or an average of twelve, for each machine. In each of the seven wood-working plants operated by the assignee, there are, on the average, two hundred and fifty machines. Based on a minimum lubricating period of twice per week for forty weeks, oiling has caused an annual loss of twenty-eight thousand man machine hours. In the four press shops which we operate, the three hundred presses and cranes consume an average of fifteen minutes for oiling. Figuring a minimum of three times per week for forty-eight weeks, it is seen that ten thousand, eight hundred machine hours per year are lost.

A suggested system for solving the difficulties of oiling machinery was the so-called "one shot" system. In this system there was but one alemite fitting. This fitting was on a large grease tube and this tube branched and rebranched like the arteries of the human body, each of the last or smallest tubes leading to a bearing. One shot of grease in the alemite fitting was supposed to force grease into every bearing. I found this system to be unsuccessful as a result of actual tests for some of the bearings would be lubricated while others would not.

Neither of the above described methods was satisfactory. The last described method results in complete lubrication. The first described method effects good lubrication but has the disadvantages referred to in detail above and is still used simply because no better system has been offered.

It is an object of this invention to provide an oiling system by which the machine may be oiled while in operation. It is a further object to provide a machine in which all points of lubrication are brought to one distribution point located conveniently within reach of the lubrication engineer, standing on the floor. This arrangement effects a saving, simply in the labor of oiling, of one man per twenty-five presses or one man per two hundred mill machines. A further advantage of this construction is that it insures better lubrication in that it lessens the probability that some bearings will be overlooked. This lessens the maintenance and breakdown costs. A further advantage of my invention is that it makes it possible to keep all the oils and greases under the control of the lubricating engineer. Records can thus be kept of each machine. I have found that in the past eight months oil and grease consumption has been reduced twelve percent by the installation of my system. A further advantage, which cannot properly be estimated in dollars and cents, is that it reduces to a minimum the probability of accidents occurring while the machine is being lubricated.

While the advantages incident to the installation of this system have been set forth in detail in relation to stationary machinery, I wish it to be understood that the benefits and advantages accruing through its use on non-stationary machinery, especially automobiles and tractors, are substantially the same and equally as great.

Other objects and advantages will appear in the course of the following description, taken in connection with the accompanying drawing, and will be particularly pointed out in the appended claims.

In the drawings:

Figure 1 is a perspective view of a conventional press, showing the arrangements of my improved oiling system.

Figure 2 is a longitudinal section of one of the oil inlet fittings, showing a section of the nozzle of the conventional grease gun or force pump connected therewith.

Figure 3 is a plan view, partly broken away, showing a modified construction of the oiling board.

In the drawing I have illustrated conventionally an ordinary press. The numeral 10 designates a stationary bearing and the numeral 12 a bearing on a moving part. On each of these bearings is an ordinary grease fitting 14. In the case of the stationary bearing 10, this grease fitting has connected directly thereto a grease tube 16. In the case of the bearing 12 mounted on a moving part, a flexible tube 18 is connected to the grease fitting 14 and is connected by an ordinary coupling 20 to individual grease tube 16. Thus each bearing on the press has its own grease fitting connected to a separate grease tube in one of these two ways, depending on whether the bearing is on a stationary or a moving part.

The grease tubes are all connected to what might be called the oiling plate or oiling bank 22. Mounted on this bank, and arranged in any appropriate manner, are the oil inlet fittings 24. Each tube is connected to its individual oil inlet fitting in a manner now to be described. The bank if initially separate may be mounted on the machine in any convenient manner.

The fittings illustrated are of the well known "dot" type although if preferred "alemite" or any other well known make of fitting may be used. Each fitting, as shown in detail in Figure 2, is hollow and is provided at its inner end with threads 26, by means of which it is fixed to the bank 22. Fixed to the inner end of the fitting is an elbow joint 28 and connected to this elbow joint by means of the screw clamp 30 is the tube 16. Each fitting 24 is swaged in at its outer end to provide a seat for a ball valve 32 held in place by means of a coil spring 34, the inner end of which abuts against the inturned inner end 23 of the fitting 24.

A conventional nozzle for a force pump or grease gun is illustrated connected to the fitting 24. While any suitable nozzle may be used, I have shown a nozzle comprising a clamping portion 36 which is threaded on its inner face for cooperation with the threads 38 of the fitting 24. While grease may be forced into the fitting by any suitable means, I prefer to use a portable force pump adapted to be momentarily and detachably connected to each of said fittings in turn.

In Figure 3 I have illustrated a modified form of oiling bank. This comprises a metal casting 49 provided with a row of openings into each of which an oil inlet fitting may be fixed. The opening in which the fitting 50 is fixed leads to the opening 56. A tube 16 can be connected in each opening 52, 56 by any suitable clamping nut arrangement 60. The fittings 50 and 54 are identical with the fitting 24 and are numbered differently solely to show the simplified structure for mounting the individual fittings and connecting each fitting with its respective grease tube.

What I claim is:

1. In a machine having fixed and moving bearings thereon, separate individual flexible oiling tubes respectively connected with each of a plurality of said moving bearings, a plurality of individual oiling tubes each connected with a flexible tube or a fixed bearing, the ends of the respective oiling tubes being assembled and connected with oil inlet fittings which are grouped with reference to convenient use of a detachable force pump,— each being provided with a separate valve-containing part to which a nozzle connected with said pump may be momentarily connected in turn.

2. In combination with a machine having bearings thereon, a plate connected with said machine, oil inlet fittings, to which a grease gun may be detachably connected, on said plate, and a plurality of oiling tubes, each tube connecting an oil inlet fitting and a bearing.

3. In combination with a machine having bearings thereon, an oil distribution plate connected with said machine, oil inlet fittings, to which a grease gun may be detachably connected, on said plate, each fitting comprising a valve, and a plurality of tubes, each tube connecting a bearing and an oil inlet fitting.

4. In combination with a machine having fixed and movable bearings, a flexible tube connected with each movable bearing, an oil distribution plate connected with said machine, oil inlet fittings, to which a grease gun may be detachably connected, on said plate, each fitting comprising a valve, and a plurality of tubes, each tube connecting an oil inlet fitting with a bearing or flexible tube.

5. The combination with a machine having a plurality of bearings thereon, of an individual lubricating conduit for each of said plurality of bearings, each conduit being provided with a fitting to which a force pump may be detachably connected and which includes an inlet valve part through which the lubricant may be forced by said pump, and means for supporting said fittings in a readily accessible group on said machine.

6. The combination with a machine having a plurality of bearings thereon, of an individual lubricting conduit for each of said plurality of bearings, each conduit being provided with a fitting to which a force pump may be detachably connected and which includes an inlet valve part through which the lubricant may be forced by said pump, and means for assembling said fittings in a group on said machine for facilitating the lubrication thereof.

7. In a lubricating system for a machine, including a plurality of widely separated bearings to be lubricated, a separate lubricant conveying tube for each bearing connected at one end to said bearing and provided at its other end with a lubricant receiving fitting, all of said tubes leading to a conveniently accessible plate, and all of said fittings being mounted on said plate in proximity to each other for separately receiving lubricant from a high pressure lubricant gun, the lubricant being forced through the fitting and its associated tube to the selected bearings to be lubricated.

In testimony whereof I affix my signature.

VINCENT M. DIRKES.